(12) United States Patent
Luo et al.

(10) Patent No.: US 11,199,846 B2
(45) Date of Patent: Dec. 14, 2021

(54) LEARNING-BASED DYNAMIC MODELING METHODS FOR AUTONOMOUS DRIVING VEHICLES

(71) Applicant: Baidu USA LLC, Sunnyvale, CA (US)

(72) Inventors: Qi Luo, Sunnyvale, CA (US); Jiaxuan Xu, Sunnyvale, CA (US); Kecheng Xu, Sunnyvale, CA (US); Xiangquan Xiao, Sunnyvale, CA (US); Siyang Yu, Sunnyvale, CA (US); Jinghao Miao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 485 days.

(21) Appl. No.: 16/204,941

(22) Filed: Nov. 29, 2018

(65) Prior Publication Data

US 2020/0174486 A1 Jun. 4, 2020

(51) Int. Cl.
*G05D 1/02* (2020.01)
*G05D 1/00* (2006.01)
*G06N 3/08* (2006.01)

(52) U.S. Cl.
CPC ......... *G05D 1/0221* (2013.01); *G05D 1/0088* (2013.01); *G05D 1/0223* (2013.01); *G06N 3/08* (2013.01); *G05D 2201/0212* (2013.01); *G05D 2201/0213* (2013.01)

(58) Field of Classification Search
CPC .. G05D 1/0221; G05D 1/0088; G05D 1/0223; G05D 2201/0212; G05D 2201/0213; G05D 1/0236; G05D 1/024; G05D 1/0242; G05D 1/0246; G05D 1/0255; G05D 1/0257; G05D 1/0259; G05D 1/0261; G05D 1/0225; G05D 1/0214; G05D 1/0278; G05D 1/028; G05D 1/0276; G06N 3/08; G06N 3/0445; G06N 3/0481; B60W 60/0011
See application file for complete search history.

(56) References Cited

U.S. PATENT DOCUMENTS

| 2009/0143932 A1* | 6/2009 | Sekiya | B25J 19/023 701/26 |
| 2013/0179382 A1* | 7/2013 | Fritsch | B60W 50/14 706/46 |
| 2015/0127150 A1* | 5/2015 | Ponulak | G05D 1/0088 700/250 |
| 2017/0140269 A1* | 5/2017 | Schaul | G06N 3/088 |

(Continued)

*Primary Examiner* — Thomas Ingram
(74) *Attorney, Agent, or Firm* — Womble Bond Dickinson (US) LLP

(57) ABSTRACT

In an embodiment, a learning-based dynamic modeling method is provided for use with an autonomous driving vehicle. A control module in the ADV can generate current states of the ADV and control commands for a first driving cycle, and send the current states and control commands to a dynamic model implemented using a trained neural network model. Based on the current states and the control commands, the dynamic model generates expected future states for a second driving cycle, during which the control module generates actual future states. The ADV compares the expected future states and the actual future states to generate a comparison result, for use in evaluating one or more of a decision module, a planning module and a control module in the ADV.

17 Claims, 9 Drawing Sheets

(56) References Cited

U.S. PATENT DOCUMENTS

| | | | |
|---|---|---|---|
| 2019/0049968 A1* | 2/2019 | Dean | G05D 1/0088 |
| 2020/0066067 A1* | 2/2020 | Herman | G07C 5/008 |
| 2020/0134394 A1* | 4/2020 | Teshome | G06N 7/005 |
| 2020/0293899 A1* | 9/2020 | Fernando | G06N 3/086 |

* cited by examiner

LEARNING-BASED DYNAMIC MODELING METHODS FOR AUTONOMOUS DRIVING VEHICLES

TECHNICAL FIELD

Embodiments of the present disclosure relate generally to operating autonomous vehicles. More particularly, embodiments of the disclosure relate to learning-based dynamic modelling methods for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors and high-definition maps, allowing the vehicle to travel with minimal human interaction or in some cases without any passengers.

An autonomous driving vehicle (ADV) relies on various modules to plan trajectories and control actuator commands. Processes and algorithms used in these modules often need to be tested, or adjusted in response to changed driving environments. A dynamic model describes the dynamic characters of an ADV, and can predict the ADV's future states based on the vehicle's current states and actuator commands.

Existing dynamic models rely on static datasheets, for example, calibration tables and analytic equations. Given the dynamic nature of an ADV's characters, it would be difficult to apply a single such dynamic model to multiple ADVs or adapt the dynamic model to different scenarios. Further, large amounts of datasheets are often required to make such dynamic models accurate and efficient. Therefore, there is a need for a light-weighted and accurate dynamic model that can be easily scaled to different vehicles.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
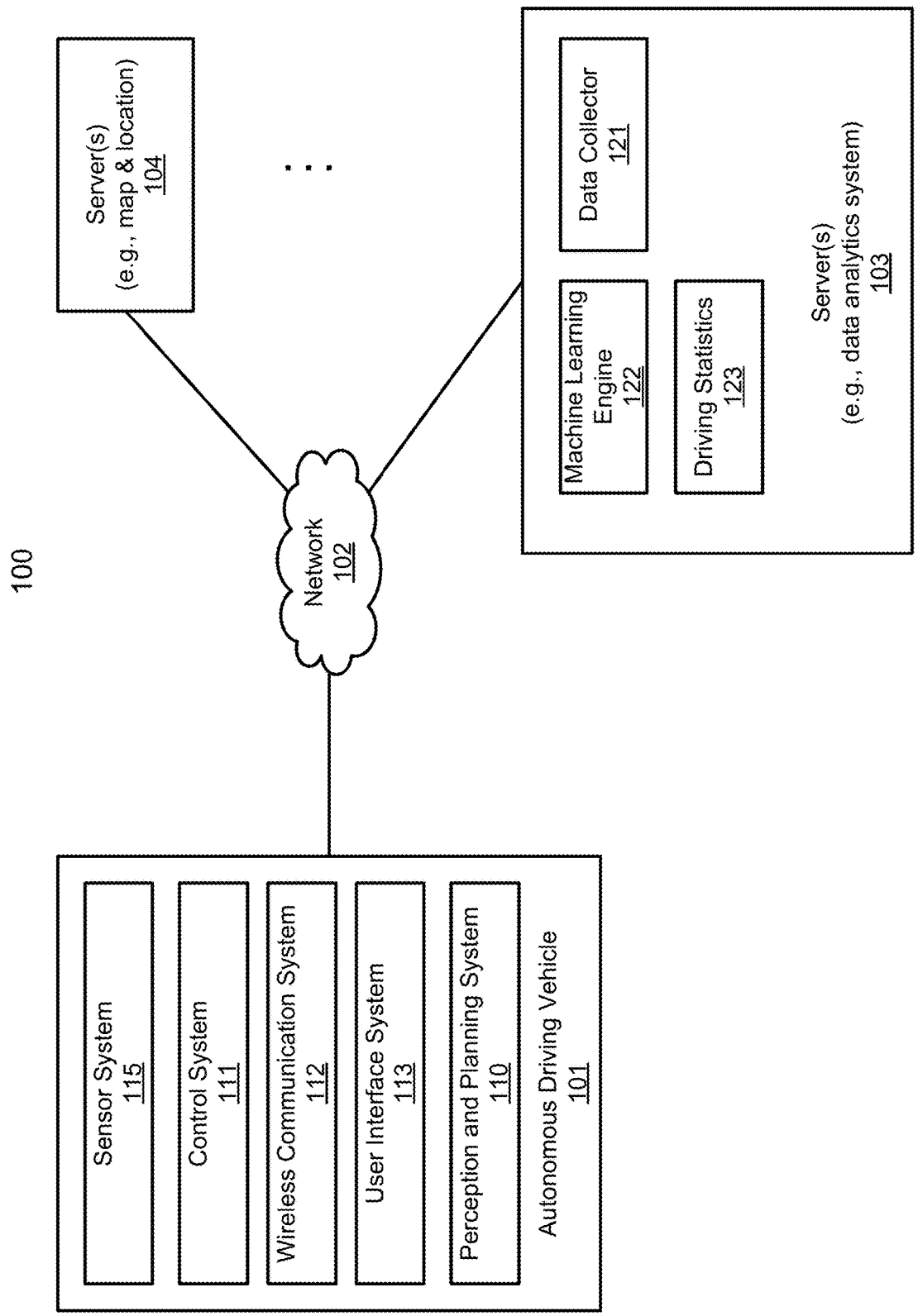
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In an embodiment, a learning-based dynamic modeling method is provided for use with an autonomous driving vehicle. A control module in the ADV can generate current states of the ADV and control commands for a first driving cycle, and send the current states and the control commands to a dynamic model that is implemented using a trained neural network model. Based on the current states and the control commands, the dynamic model generates expected future states for a second driving cycle. The control module also generates actual future states for the second driving cycle. The ADV can subsequently compare the expected future states and the actual future states to generate a comparison result, which can be used to evaluate one or more of a decision module, a planning module and a control module in the ADV.

In an embodiment, the trained neural network used to implement the dynamic model can be one of a linear regression, a multiplayer perceptron (MLP), or a recurrent neural network (RNN), or another type of neural network model. The neural network model can be trained using in an offline mode using real-world data collected by sensors of ADVs in various road conditions. The neural network model can include an input layer, one or more hidden layers and an output layer. The input layer feeds the current states and the control commands as inputs into one or more hidden layer. Each hidden layer encapsulates complex functions used to generate intermediate outputs from the inputs. The output layer collects the intermediate outputs and produces expected future states 408 for the second driving cycle of the ADV.

The current states include a speed, an acceleration, and an angular velocity of the ADV for a first driving cycle; and the control commands includes a throttle command, a brake command and a steering command for the first driving cycle. Each current state can have a corresponding expected future state and an actual future state for a second driving cycle. Each of the first driving cycle and the second driving cycle can be a time interval during which the ADV generates planning and control data, and issues one or more control commands based on the planning and control data.

The learning-based dynamic model can be used to test and adjust control and planning algorithms in a simulation environment based on real-world dynamic characters (e.g., current states and actual future states) of an ADV, before deploying these algorithms to the ADV. As such, the learning-based dynamic algorithms can greatly improve the safety and efficiency of algorithm development for ADVs.

In an embodiment, the ADV also includes an inverse dynamic model configured to compute one or more control commands based on the current states and the expected future states, for use in real-time adaptive control of the ADV.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
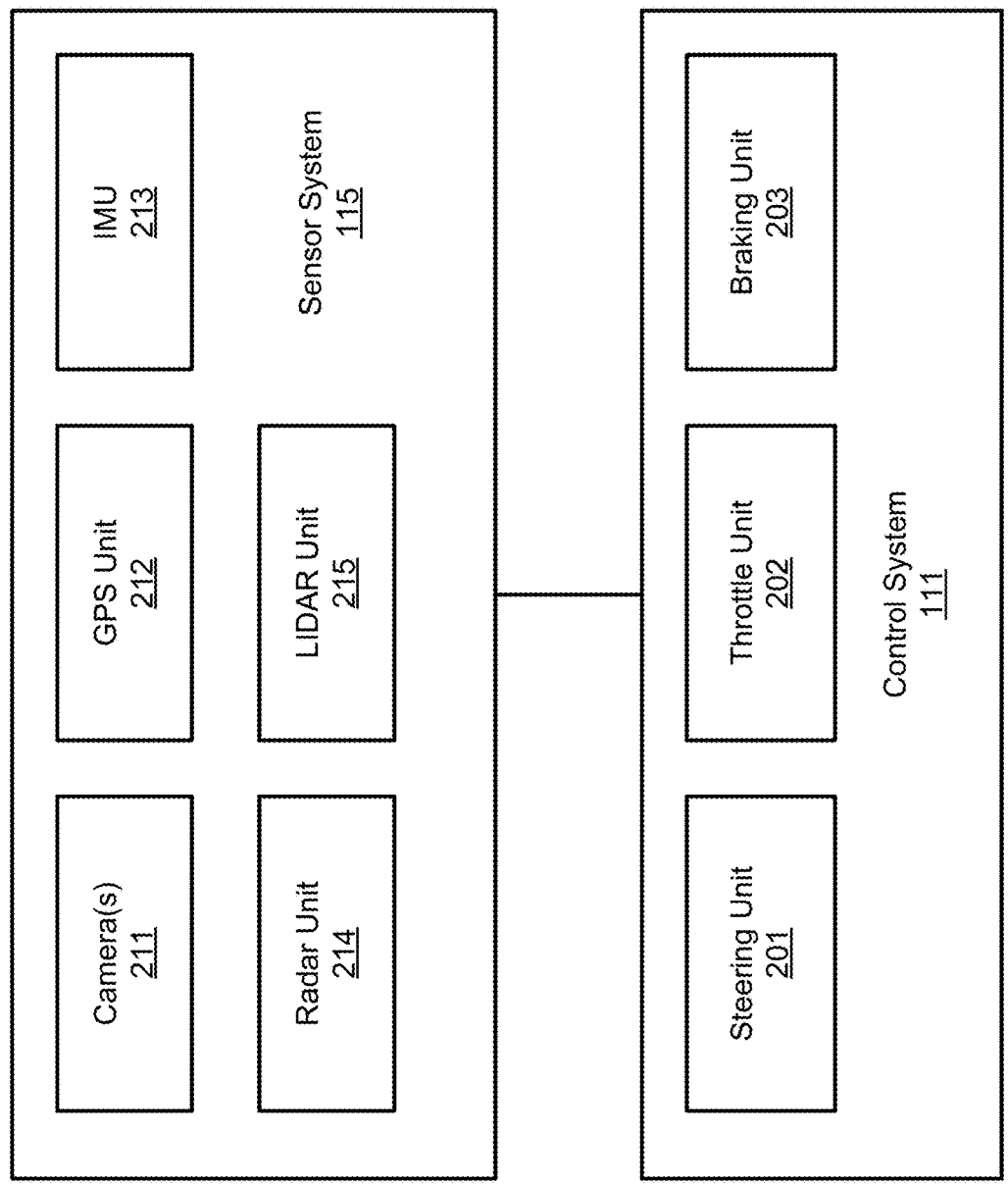
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, a set of quintic polynomial functions may be selected and defined with initial coefficients or parameters. Furthermore, a set of constraints may also be defined based on the hardware characteristics such as sensors specification and specific vehicle designs, which may obtained from the driving statistics 123. Algorithms 124 can then be uploaded on ADVs to be utilized during autonomous driving in real-time.

Figure 3A:
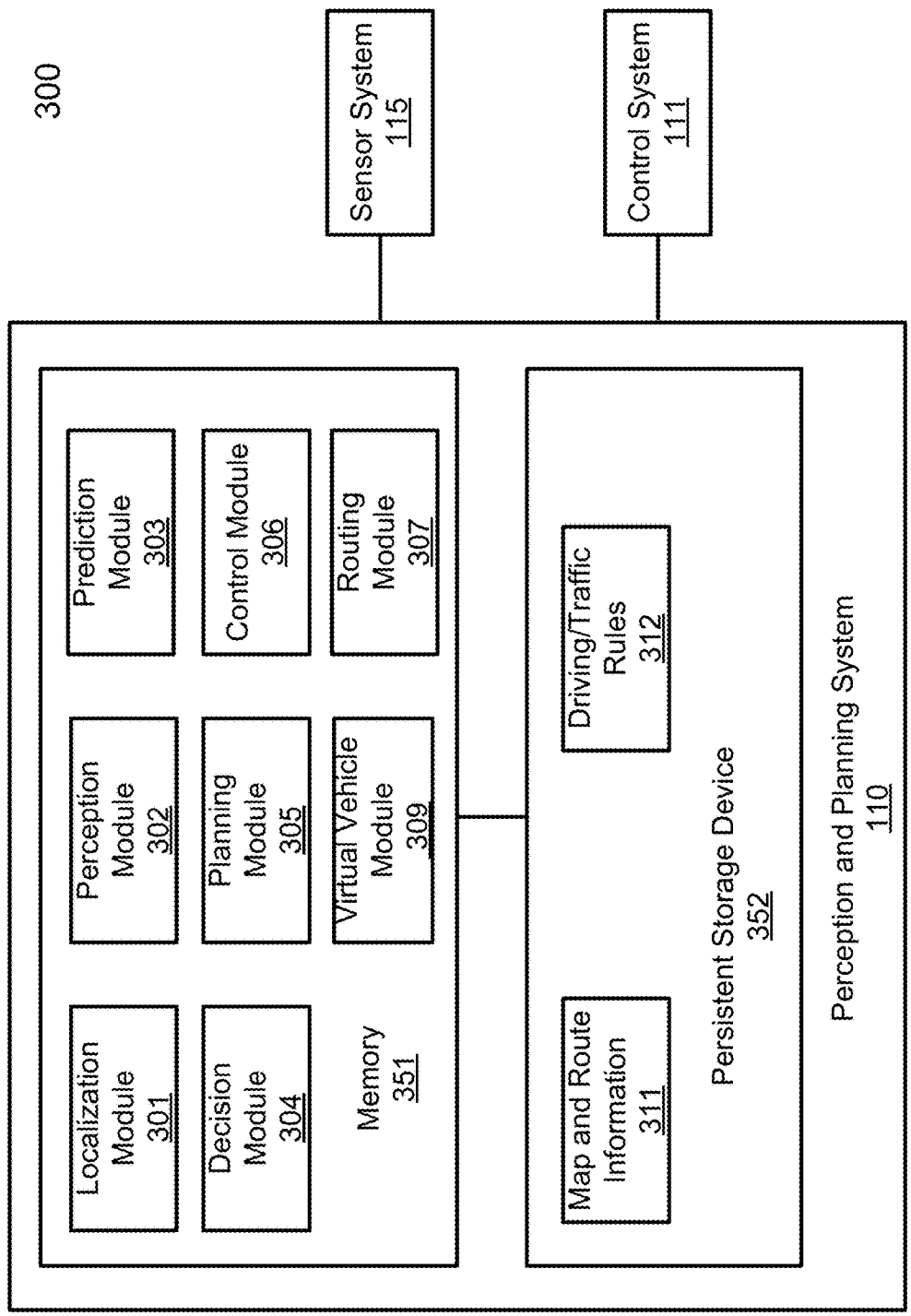
FIGS. 3A-3B are block diagrams illustrating an example of a perception and planning system used with an autonomous vehicle according to one embodiment.
Figure 3B:
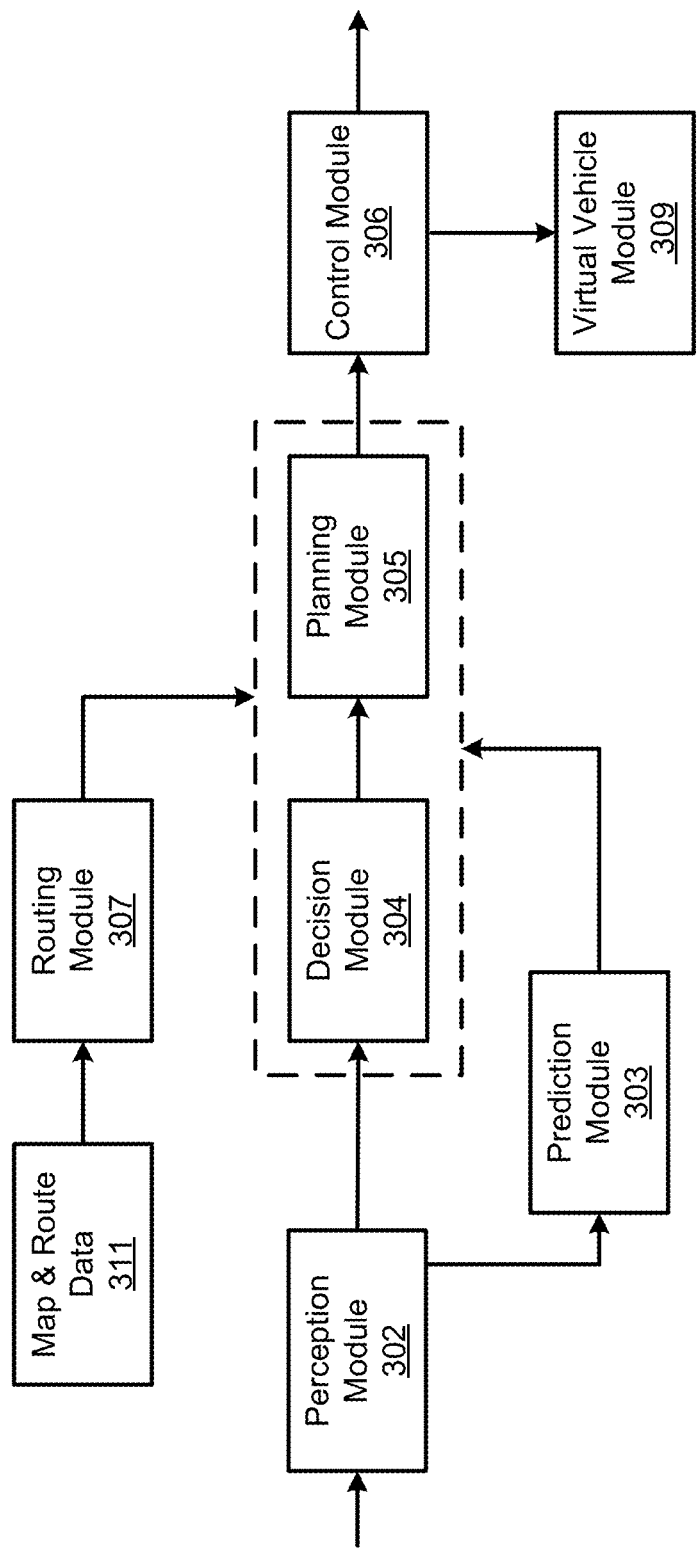

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and virtual vehicle module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The virtual vehicle module 309 can operate as a simulator, and can be implemented using a trained neural network model. When the control module 306 generates current sates of the ADV (e.g., speed) and control commands in a driving cycle of the planning phase, the control module 306 can send the current states and the control commands to the trained neutral model for generating expected future states of the ADV for a second driving cycle. The ADV can compare the expected future states, and actual future states generated by the control module 306 for the second driving cycle. A comparison result between the two sets of future states can be used to evaluate the decision module 304, the planning module 305, the control module 306, and one or more other modules in the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Dynamic Model

Figure 4:
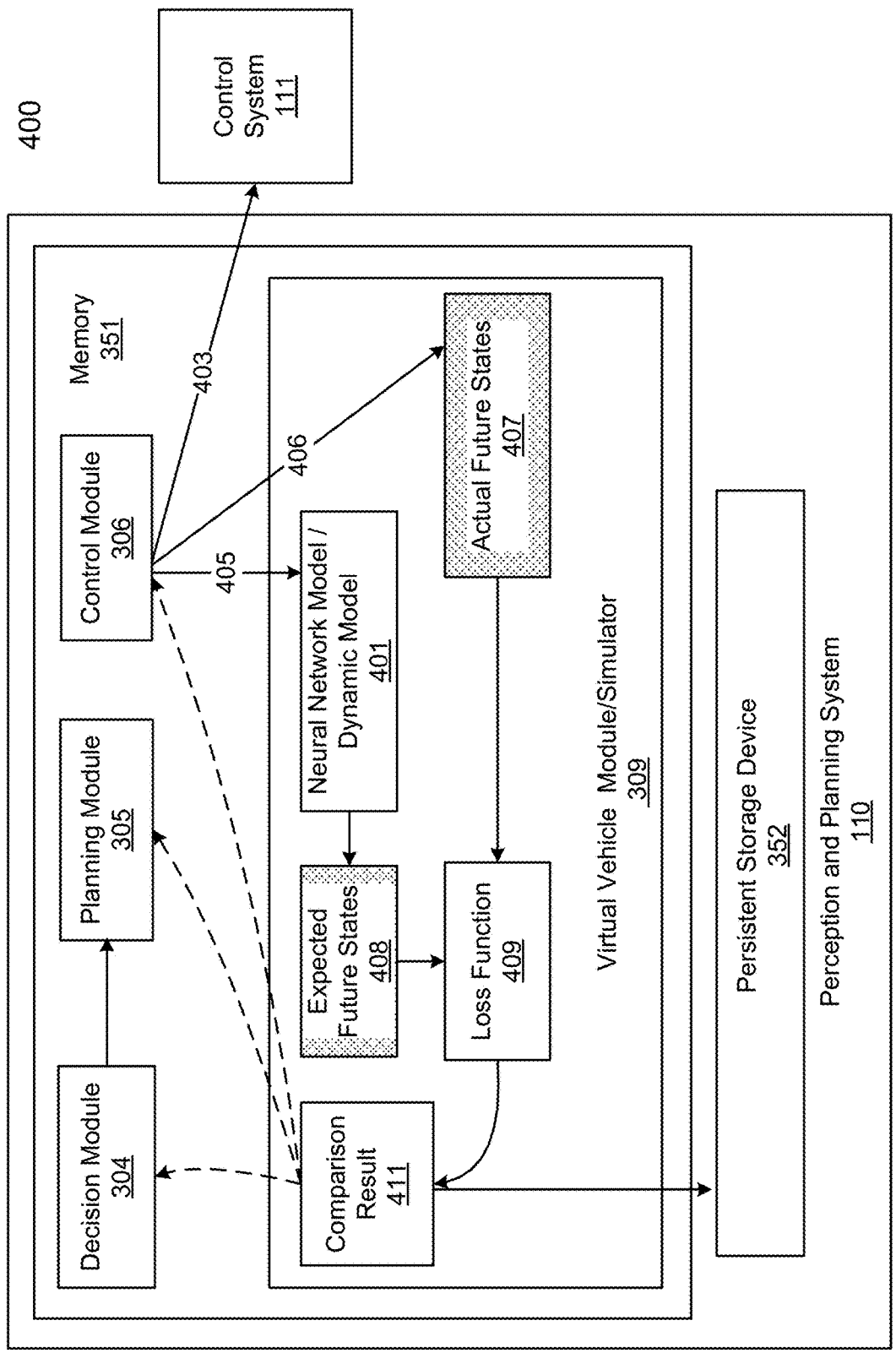
FIG. 4 illustrates a system for providing a dynamic model for use with an ADV in accordance with an embodiment.

FIG. 4 illustrates a system for providing a dynamic model for use with an ADV in accordance with an embodiment.

As shown in FIG. 4, the virtual vehicle module 309 can operate as a simulator, and can include a trained neural network model 401. The trained neutral network model 401 is a dynamic model that can receive 405 a set of current states of the ADV and one or more control commands generated by the control module 306 during a particular driving cycle. The one or more control commands are also sent 403 to the control system 111 for navigating the ADV to a next target position according to a route or path defined by planning and control data.

The neural network model 401 can be trained in offline mode using real-world data collected by sensors (e.g., IMU and GPS) to record real-time dynamics (e.g., states) of vehicles in various scenarios that may cover a variety of road types, obstacle types and road environments. For example, the real-world data can be downloaded from the Apollo Open Data Platform of BAIDU™. The neural network model 401 can include an input layer, one or more hidden layers and one or more output layers. The input layer feeds the current states and the control commands as inputs into the one or more hidden layers. Each hidden layer encapsulates complex functions used to generate intermediate outputs from the inputs. The one or more output layers collect the intermediate outputs and produces expected future states 408 for the second driving cycle of the ADV.

In an embodiment, states of the ADV can include driving parameters, such as speed, acceleration, angular velocity. The above-mentioned states of the ADV are provided as examples. Other states can also be used as input to the dynamic model depending on simulation or evaluation requirements. For example, if the dynamic model is to simulate slope conditions of the ADV, one or more pitching angles of the ADV can be used as inputs to the dynamic model. Control commands can include commands related to throttle, brake and wheel steering. The ADV can generate driving parameters in each driving cycle (e.g., 100 ms). A driving cycle can be a time interval during which the ADV generates planning and control data, and issues one or more control commands based on the planning and control data.

In an embodiment, the virtual vehicle module 309 can receive 406 actual future states 407 generated by the control module 306 for the second driving cycle. The expected future states 408 and the actual future states 407 can be compared using a loss function 409 to generate a comparison result 411. The comparison result 411 can be persisted to the persistent storage device 352 for future use, for example, fine-tuning the dynamic model 401, and evaluating the decision module 304, the planning module 305, and/or the control module 306.

Since the states of the ADV and control commands are issued by the control module 306 based on data from the decision module 304 and the planning module 305, significant differences between the actual future states 407 and the expected future states 408 would indicate that one or more processes or algorithms used in those modules do not perform as expected. In offline mode, differences in the comparison result 411 can be used to evaluate and modify those modules.

Figure 5:
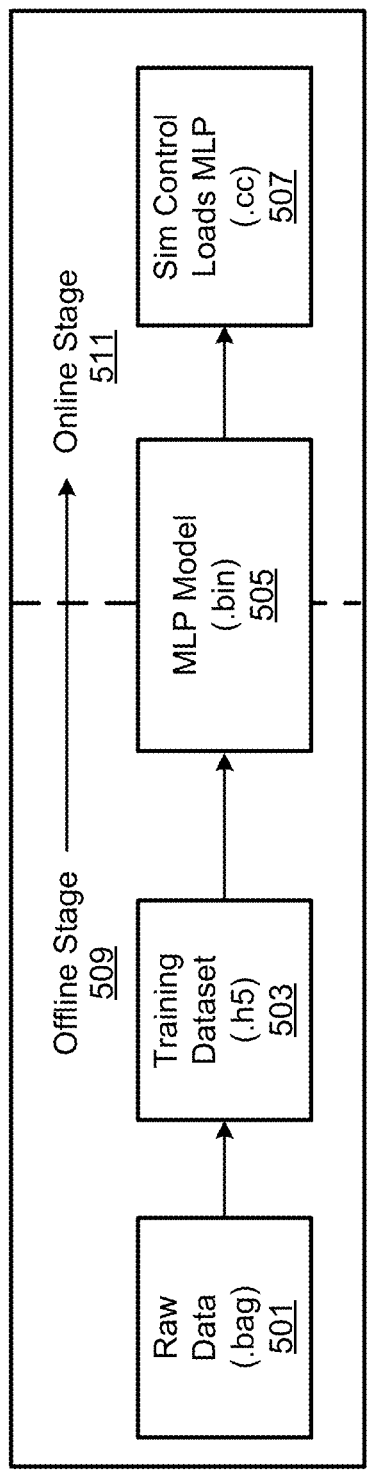
FIG. 5 illustrates an example data flow of using the dynamic model in accordance with an embodiment.

FIG. 5 illustrates an example data flow of using the dynamic model in accordance with an embodiment.

The data flow shown in FIG. 5 uses a multiplayer perceptron (MLP) neural network model as an example, and starts with an offline stage 509, during which training datasets 503 can be extracted using a script from raw data 501, for example, data on Apollo data platform of BAIDU™. The MLP model is then trained and the result of the training is stored in a binary file 505.

During an online stage 511, the trained MLP model 505 can be loaded 507 using a simulation control loader into memory of an autonomous driving vehicle, and can be used to predict and states of the ADV.

In an embodiment, an input layer of the MLP neural network model 505 contains the ADV's latest/current states (e.g., speed, acceleration, angular velocity) and control commands (e.g., throttle, brake, steering). An output layer of the MLP neural network model 505 contains predicted acceleration and angular velocity for the next driving cycle. The ADV's speed and heading in the next driving cycle can be calculated by integrating the predicted acceleration and angular velocity over time.

Figure 6:
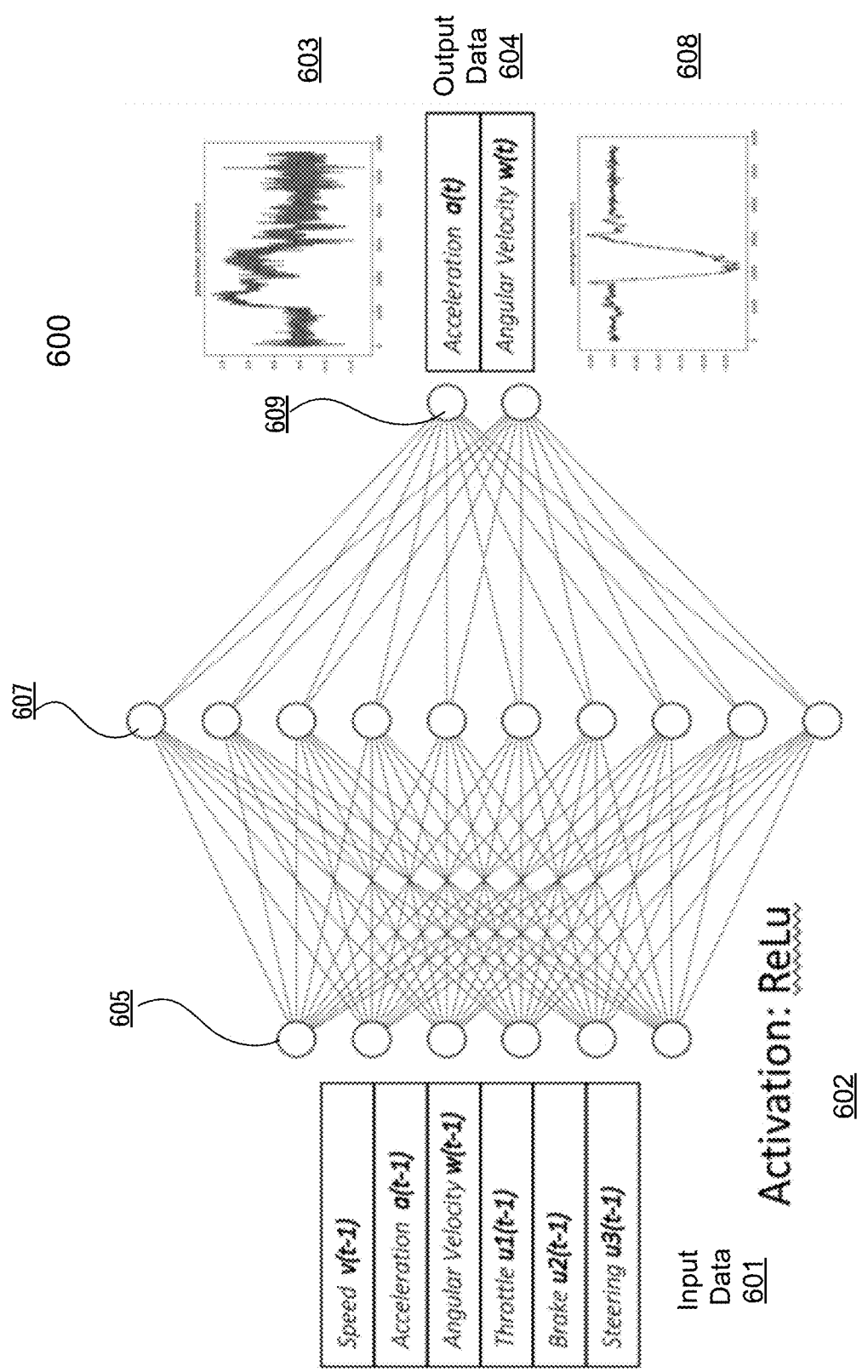
FIG. 6 illustrates an example neural network model used in the ADV in accordance with an embodiment.

FIG. 6 illustrate an example neural network model used in the ADV in accordance with an embodiment.

Neural network model 600 is a multiplayer perceptron (MLP) neural network model trained using real-world data collected by sensors in vehicles. A neural network model can include a collection of connected neurons designed to model a human brain. Neurons in an MLP neural network model are fully connected, with each node in one layer connecting with a certain weight to every node in the following layer. During the training, a neural network model 600 changes connection weights after each piece of data is processed based on the amount of error in the output compared to the expected result.

Referring back to FIG. 6, the MLP neural network model 600 can include an input layer 606 to receive the input data 601, an output layer 609 that makes decisions or predictions about the input data, and an arbitrary number of hidden layers (for example, hidden layer 607) between the input layer 601 and the output layer 609. The hidden layers are the true computational engine of the neural network model 600. Neurons in the hidden layer 607 can include activation functions for transforming the input data 601. Rectified Linear Unit (ReLU) 602 is an activation function used in the neural network model 600. ReLu 602 returns 0 if it receives any negative input; and for any positive value returns, it returns that value back. Although FIG. 600 shows one hidden layer 607 and one output layer 609, the MLP neural network model 600 can include multiple hidden layers and multiple output layers.

In an embodiment, the input data 601 for the neural network model 600 includes state of an ADV (e.g., a speed, an acceleration, and an angular velocity), and control commands (e.g., a throttle command, a brake command, and a steering command) for a first driving cycle. The input data 601 are processed by one or more hidden layers and transformed to the output data 604, which are expected states of the ADV for a second driving cycle. Each expected states (e.g., acceleration and angular velocity) can be displayed graphically 603 and 608. Based on the acceleration and angular velocity over time, the speed of the ADV for the second driving cycle can be computed.

Figure 7:
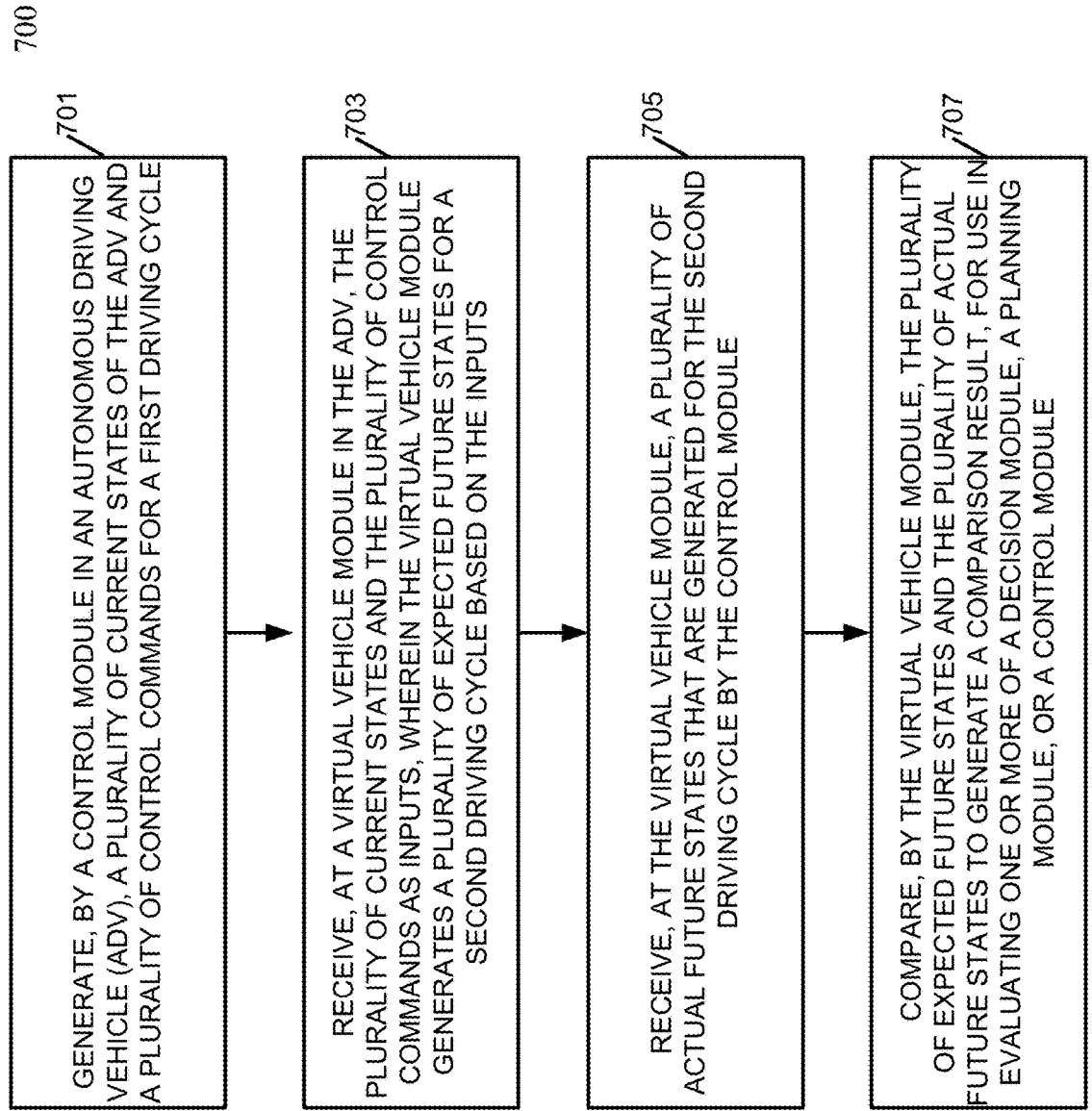
FIG. 7 is a flow diagram illustrating an example process of providing a dynamic model for use with an ADV in accordance with an embodiment.

FIG. 7 is a flow diagram illustrating an example process of providing a dynamic model for use with an ADV in accordance with an embodiment.

Process 700 may be performed by processing logic which may include software, hardware, or a combination thereof. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 700 may be performed by one or more of perception module 302 and planning module 309, illustrated in FIG. 3A and FIG. 3B. Referring to FIG. 7, in operation 701, a number of current states of the ADV are measured in response to a first set of one or more control commands for a first driving cycle to control the ADV. The current states can be generated by a control module in the ADV in response to the first set of control commands for the first driving cycle. The current states of the ADV may include speed, acceleration and angular velocity of the ADV during the first driving cycle. The control command may include a brake command, a throttle command and a steering command. In operation 703, the dynamic model is used to predict expected future states for a second driving cycle based on the current states and the first set of control commands. The dynamic model receives the current states and the control commands as inputs, and generates the expected future states for the second driving cycle based on the inputs. The dynamic model represents a neural network model trained using human-edited datasets which can be obtained from an open source data platform. In operation 705, a number of actual future states are measured in response to a second set of one or more control commands for the second driving cycle to control the ADV. The actual future states are generated by the control commands for the second driving cycle. In operation 707, the expected future states and the actual future states are compared to generate a comparison result. In operation 709, a planning algorithm is modified based on the comparison, for use in planning a subsequent path to autonomously drive the ADV at real-time.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
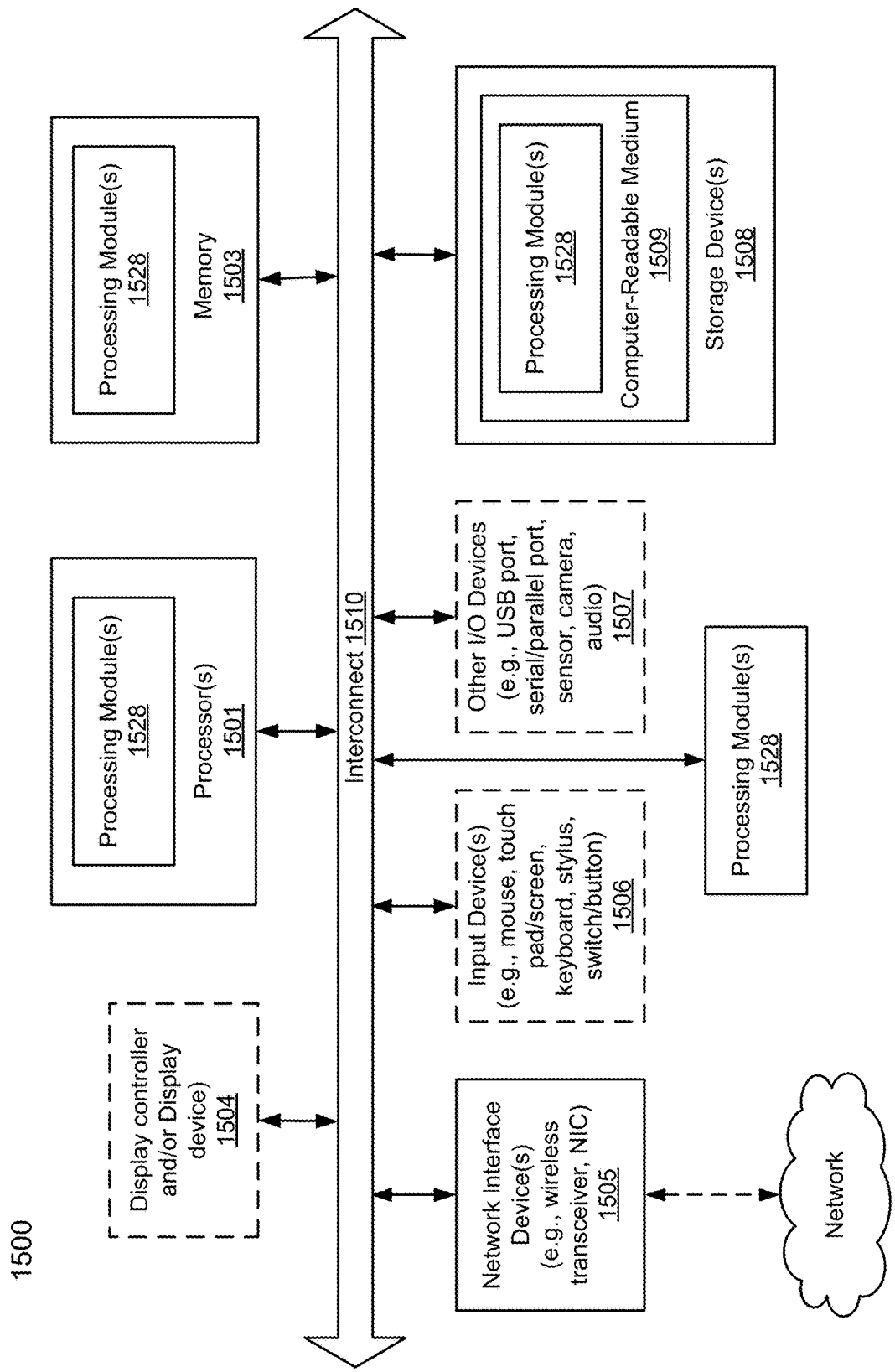
FIG. 8 is a block diagram illustrating an example of a data processing system which may be used with one embodiment.

FIG. 8 a block diagram illustrating an example of a data processing system which may be used with one embodiment of the disclosure. For example, system 1500 may represent any of data processing systems described above performing any of the processes or methods described above, such as, for example, the virtual vehicle module 309 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and virtual vehicle module 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of evaluating an autonomous driving system of an autonomous driving vehicle (ADV), comprising:
   measuring a plurality of current states of the ADV for a first driving cycle, wherein the plurality of current states of the ADV include a speed, an acceleration, and an angular velocity of the ADV;
   predicting, using a dynamic model in the ADV, a plurality of expected future states for a second driving cycle of the ADV based on the plurality of current states for the first driving cycle and a first set of control commands issued for the first driving cycle, wherein the first set of control commands include a throttle command, a brake command, and a steering command, wherein the dynamic model is a trained neural network model, wherein the plurality of current states and the first set of control commands are provided as input to the trained neural network model;
   measuring a plurality of actual future states for the second driving cycle to control the ADV in response to the first set of control commands; and
   comparing the plurality of expected future states and the plurality of actual future states, wherein a result of the comparison is used to modify one or more autonomous driving modules in the autonomous driving system of the ADV.

2. The method of claim 1, wherein the trained neural network model is one of a linear regression, a multiplayer perceptron (MLP), or a recurrent neural network (RNN).

3. The method of claim 2, wherein the trained neural network model is trained using datasets that include real-world data collected by sensors in vehicles.

4. The method of claim 1, wherein the ADV further includes an inverse dynamic model, which is configured to compute one or more control commands based on the plurality of current states and the plurality of expected future states, wherein the one or more control commands are used for real-time adaptive control of the ADV.

5. The method of claim 1, wherein the result of the comparison is persisted in a persistent storage for future use.

6. The method of claim 1, wherein each of the first driving cycle and the second driving cycle is a time interval during which the ADV generates planning and control data, and issues one or more control commands based on the planning and control data.

7. A non-transitory machine-readable medium having instructions stored therein, which when executed by a processor, causing the processor to perform operations of evaluating an autonomous driving system of an autonomous driving vehicle (ADV), the operations comprising:
   measuring a plurality of current states of the ADV for a first driving cycle, wherein the plurality of current states of the ADV include a speed, an acceleration, and an angular velocity of the ADV;
   predicting, using a dynamic model in the ADV, a plurality of expected future states for a second driving cycle of the ADV based on the plurality of current states for the first driving cycle and a first set of control commands issued for the first driving cycle, wherein the first set of control commands include a throttle command, a brake command, and a steering command, wherein the dynamic model is a trained neural network model, wherein the plurality of current states and the first set of control commands are provided as input to the trained neural network model;
   measuring a plurality of actual future states for the second driving cycle to control the ADV in response to the first set of control commands; and
   comparing the plurality of expected future states and the plurality of actual future states, wherein a result of the comparison is used to modify one or more autonomous driving modules in the autonomous driving system of the ADV.

8. The non-transitory machine-readable medium of claim 7, wherein the trained neural network model is one of a linear regression, a multiplayer perceptron (MLP), or a recurrent neural network (RNN).

9. The non-transitory machine-readable medium of claim 8, wherein the trained neural network model is trained using datasets that include real-world data collected by sensors in vehicles.

10. The non-transitory machine-readable medium of claim 7, wherein the ADV further includes an inverse dynamic model, which is configured to compute one or more control commands based on the plurality of current states and the plurality of expected future states, wherein the one or more control commands are used for real-time adaptive control of the ADV.

11. The non-transitory machine-readable medium of claim 7, wherein the result of the comparison is persisted in a persistent storage for future use.

12. The non-transitory machine-readable medium of claim 7, wherein each of the first driving cycle and the second driving cycle is a time interval during which the ADV generates planning and control data, and issues one or more control commands based on the planning and control data.

13. A data processing system, comprising:
   a processor; and
   a memory coupled to the processor to store instructions, which, when executed by a processor, cause the processor to perform operations of evaluating an autonomous driving system of an autonomous driving vehicle (ADV), the operations comprising:

measuring a plurality of current states of the ADV for a first driving cycle, wherein the plurality of current states of the ADV include a speed, an acceleration, and an angular velocity of the ADV;

predicting, using a dynamic model in the ADV, a plurality of expected future states for a second driving cycle of the ADV based on the plurality of current states for the first driving cycle and a first set of control commands issued for the first driving cycle, wherein the first set of control commands include a throttle command, a brake command, and a steering command, wherein the dynamic model is a trained neural network model, wherein the plurality of current states and the first set of control commands are provided as input to the trained neural network model;

measuring a plurality of actual future states for the second driving cycle to control the ADV in response to the first set of control commands; and comparing the plurality of expected future states and the plurality of actual future states, wherein a result of the comparison is used to modify one or more autonomous driving modules in the autonomous driving system of the ADV.

14. The system of claim 13, wherein the trained neural network model is one of a linear regression, a multiplayer perceptron (MLP), or a recurrent neural network (RNN).

15. The system of claim 14, wherein the trained neural network model is trained using datasets that include real-world data collected by sensors in vehicles.

16. The system of claim 13, wherein the ADV further includes an inverse dynamic model, which is configured to compute one or more control commands based on the plurality of current states and the plurality of expected future states, wherein the one or more control commands are used for real-time adaptive control of the ADV.

17. The system of claim 13, wherein the result of the comparison is persisted in a persistent storage for future use, and wherein each of the first driving cycle and the second driving cycle is a time interval during which the ADV generates planning and control data, and issues one or more control commands based on the planning and control data.

\* \* \* \* \*